United States Patent
Fabre

(10) Patent No.: US 10,144,501 B2
(45) Date of Patent: Dec. 4, 2018

(54) METHOD AND DEVICE FOR AUTOMATIC MANAGEMENT OF AN ACTUATOR CONTROLLED BY A SERVO-VALVE

(71) Applicant: Airbus Operations S.A.S., Toulouse (FR)

(72) Inventor: Pierre Fabre, Tournefeuille (FR)

(73) Assignee: Airbus Operations S.A.S. (FR)

( * ) Notice: Subject to any disclaimer, the term of this patent is extended or adjusted under 35 U.S.C. 154(b) by 241 days.

(21) Appl. No.: 15/212,582

(22) Filed: Jul. 18, 2016

(65) Prior Publication Data

US 2017/0021913 A1 Jan. 26, 2017

(30) Foreign Application Priority Data

Jul. 21, 2015 (FR) ...................................... 15 56881

(51) Int. Cl.
| | |
|---|---|
| *G05B 13/02* | (2006.01) |
| *B64C 9/00* | (2006.01) |
| *B64C 13/16* | (2006.01) |
| *B64C 13/50* | (2006.01) |
| *G05B 13/04* | (2006.01) |
| *G05D 1/08* | (2006.01) |

(52) U.S. Cl.
CPC ................ *B64C 9/00* (2013.01); *B64C 13/16* (2013.01); *B64C 13/503* (2013.01); *G05B 13/042* (2013.01); *G05D 1/0825* (2013.01); *B64C 2009/005* (2013.01)

(58) Field of Classification Search
CPC .............. B64C 13/504; G05B 23/0254; G05B 13/042; G05B 23/0235; G05B 13/021; G05B 17/02; G05B 19/404; G05B 19/4062; G05B 2219/41311; G05B 2219/49181; G05B 2219/42306
See application file for complete search history.

(56) References Cited

U.S. PATENT DOCUMENTS

| | | | |
|---|---|---|---|
| 3,361,394 A | | 1/1968 | Pfersch |
| 4,637,002 A | * | 1/1987 | Sallas ...................... G01V 1/04 181/401 |
| 4,663,703 A | | 5/1987 | Axelby et al. |
| 5,319,296 A | * | 6/1994 | Patel .................. G05B 19/4062 244/227 |

(Continued)

OTHER PUBLICATIONS

FR 15 56881 Search Report dated Jun. 12, 2016.

*Primary Examiner* — Darrin D Dunn
(74) *Attorney, Agent, or Firm* — Lerner, David, Littenberg, Krumholz & Mentlik, LLP

(57) ABSTRACT

The device for automatic management of an actuator controlled by a servo-valve, includes a sensor for measuring the actual value of a parameter at the output of the actuator for a given control command, a computation unit for computing a theoretical value of said parameter, by applying the control command to a nominal performance model which models the operation of the actuator exhibiting nominal performance, a computation unit for computing the difference between the measured actual value of the parameter and the computed theoretical value of said parameter, a control unit for computing an adapted gain as a function of this difference, and a link for applying the adapted gain to the servo-valve for it to use it as gain value, so as to allow the actuator to restore nominal performance.

12 Claims, 1 Drawing Sheet

(56) References Cited

U.S. PATENT DOCUMENTS

| | | | | |
|---|---|---|---|---|
| 5,486,997 A * | 1/1996 | Reismiller | G05B 13/026 | 700/45 |
| 6,003,811 A * | 12/1999 | Trikha | G05D 1/0833 | 244/195 |
| 6,198,246 B1 * | 3/2001 | Yutkowitz | G05B 11/42 | 318/561 |
| 6,693,399 B2 * | 2/2004 | Silvestro | G05B 19/19 | 318/566 |
| 6,751,046 B1 * | 6/2004 | Szita | G11B 5/59627 | 360/77.04 |
| 6,917,840 B2 * | 7/2005 | Lund | G05B 5/01 | 700/29 |
| 7,283,321 B1 * | 10/2007 | Sun | G11B 5/5552 | 360/78.05 |
| 7,891,180 B2 * | 2/2011 | Le Bastard | G05B 23/0235 | 60/406 |
| 8,160,770 B2 * | 4/2012 | Goupil | B64C 13/50 | 244/99.11 |
| 8,290,631 B2 * | 10/2012 | Sweeney | F15B 19/005 | 251/129.04 |
| 8,818,573 B2 * | 8/2014 | Goupil | B64D 45/0005 | 701/3 |
| 9,037,272 B2 * | 5/2015 | Yuan | F15B 13/0433 | 700/37 |
| 2001/0037670 A1 * | 11/2001 | Boger | F15B 5/006 | 73/1.72 |
| 2002/0156541 A1 * | 10/2002 | Yutkowitz | G05B 11/28 | 700/28 |
| 2003/0183728 A1 * | 10/2003 | Huynh | B64C 13/10 | 244/224 |
| 2004/0193327 A1 * | 9/2004 | Yakushi | F15B 9/09 | 700/282 |
| 2009/0048748 A1 | 2/2009 | Zhao et al. | | |
| 2009/0309574 A1 * | 12/2009 | Goupil | G05B 23/0235 | 324/76.41 |
| 2010/0152925 A1 * | 6/2010 | Goupil | B64C 13/50 | 701/3 |
| 2010/0229975 A1 * | 9/2010 | Sweeney | F15B 19/005 | 137/556 |
| 2012/0101706 A1 * | 4/2012 | Masse | G05B 23/0221 | 701/100 |
| 2013/0026287 A1 * | 1/2013 | Goupil | B64C 13/50 | 244/99.9 |
| 2013/0297045 A1 * | 11/2013 | Yuan | F15B 13/0433 | 700/28 |
| 2013/0325254 A1 * | 12/2013 | Goupil | G05B 23/0254 | 701/33.9 |
| 2013/0338898 A1 * | 12/2013 | Aurousseau | G05B 23/0221 | 701/100 |
| 2014/0129024 A1 * | 5/2014 | Lee | G05B 19/404 | 700/186 |
| 2017/0057620 A1 * | 3/2017 | Kossentini | B64C 13/503 | |

* cited by examiner

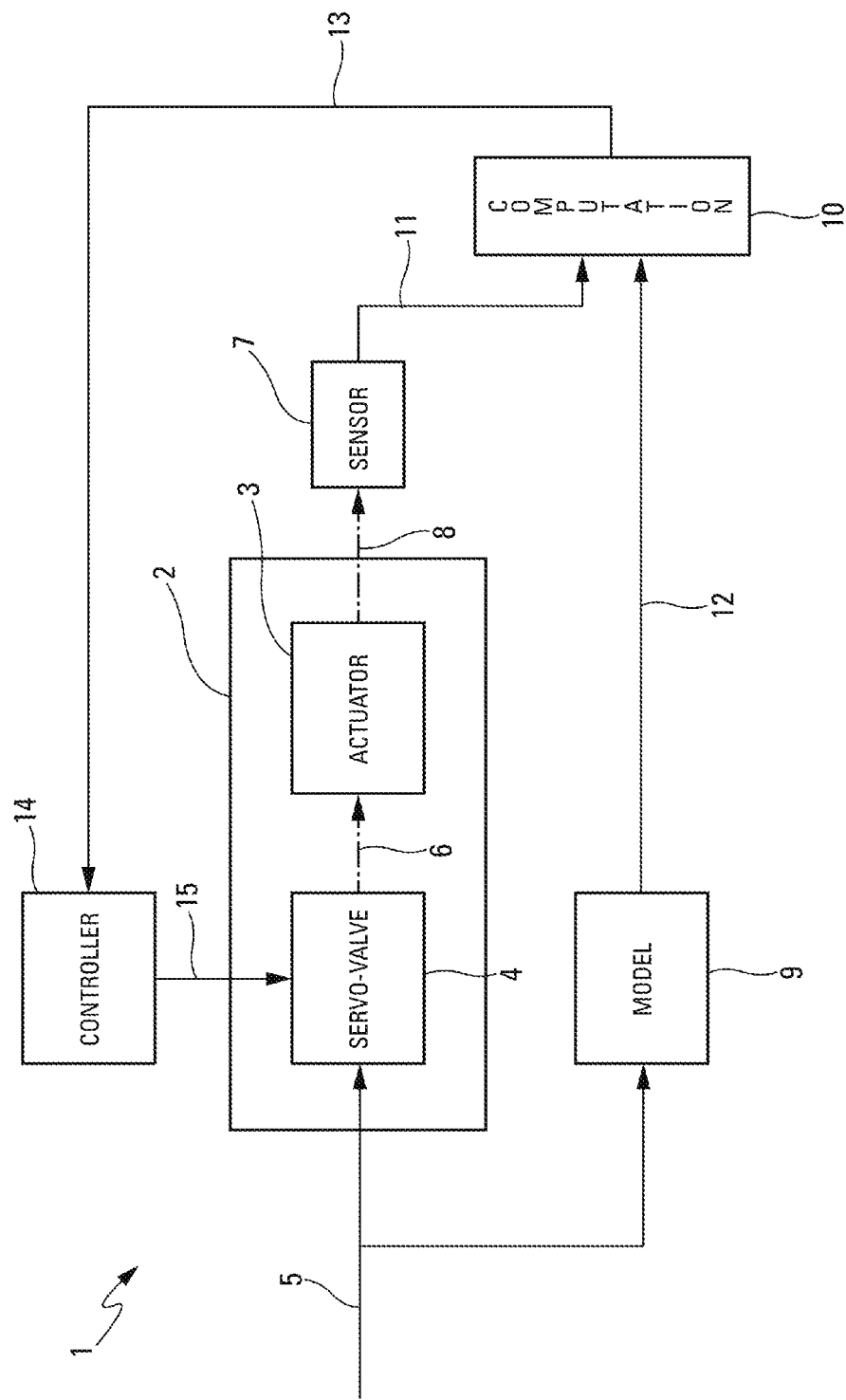

METHOD AND DEVICE FOR AUTOMATIC MANAGEMENT OF AN ACTUATOR CONTROLLED BY A SERVO-VALVE

FIELD OF THE INVENTION

The present invention relates to a method and a device for automatic management of an actuator controlled by a servo-valve.

The present invention applies to any type of actuator, notably of an aircraft and in particular of a transport airplane. It can be, in particular, an actuator intended to actuate a control surface of an aircraft, such as a flight control surface, a foil flap, an aileron, etc. By way of illustration, it can be the actuator intended to control the rudder from a control command generated by the actuation of a rudder bar by a pilot of the aircraft.

The invention applies, more particularly, to an actuator controlled by a servo-valve using at least one value of a gain and receiving a control command.

BACKGROUND OF THE INVENTION

It is known that such an actuator can be subject to a performance dispersion. The performance dispersion of the actuator is a significant drawback in optimizing the performance levels of the control laws.

The control law must be robust to the most critical actuator performance and this causes the gain used by the servo-valve to be reduced compared to what would be possible with an actuator exhibiting nominal performance.

This situation is not therefore optimal.

BRIEF SUMMARY OF THE INVENTION

An aspect of the present invention may remedy this drawback. It relates to a method for automatic management of an actuator, said actuator being controlled by a servo-valve using at least one value of a gain and receiving a control command.

According to an aspect of the invention, the automatic management method comprises:

a measurement step consisting in measuring, in real time, the effective value of a parameter at the output of the actuator for a given control command;

a first computation step consisting in computing, in real time, a theoretical value of said parameter, by applying said control command to a nominal performance model, the nominal performance model modeling the operation of an actuator exhibiting nominal performance;

a second computation step consisting in computing, in real time, the difference between the measured effective value of the parameter and the computed theoretical value of said parameter;

a checking step consisting in computing a so-called adapted gain of the actuator as a function of this difference, the adapted gain being computed so as to allow the actuator to restore, if necessary, nominal performance when said adapted gain is applied to the servo-valve; and an application step consisting in applying, in real time, said adapted gain to the servo-valve for it to use it as gain value.

Thus, by virtue of an aspect of the invention, when it is detected that the performance of the actuator is different from a nominal performance (via the computation of the difference between the measured effective value and the corresponding theoretical value), the gain of the servo-valve is adapted in real time (by computing and by applying the adapted gain) to restore the nominal performance, which makes it possible to reduce the dispersion indicated above and remedy the abovementioned drawback.

In the context of the present invention, it is considered that said parameter (whose values are taken into account for the implementation of the invention) can be any parameter with a value that can be measured or determined at the output of the actuator and the value of which varies as a function of the effective performance of the actuator.

Advantageously, said parameter is one of the following parameters:

a phase shift;

a gain dispersion.

Moreover, advantageously, said performance model comprises a transfer function between the control command of a control law and the position of the actuator.

In a particular embodiment, in which the method is intended to adapt the gain of a servo-valve of an aircraft steering actuator, in order at least to reduce the phase shift between said actuator and the nominal transfer function of the actuator, the checking step consists in computing said adapted gain K using the following expression:

$$K = K_0 * \frac{1}{a * \int (\varphi_0 - \varphi)}$$

in which:

$K_0$ is an initial gain of the servo-valve;

$\varphi_0$ is a phase at the output of the nominal performance model;

$\varphi$ is a phase at the output of the actuator; and a is an adaptation gain setting the speed with which the adapted gain K converges toward a desired value.

In this particular embodiment, said (abovementioned) difference corresponds to a phase difference, said phase difference being computed from the time difference between the zero crossing of the output of the actuator and the closest zero crossing of the output of the nominal performance model.

The present invention relates also to a device for automatic management of an actuator, said actuator being controlled by a servo-valve using at least one value of a gain and receiving a control command.

According to an embodiment of the invention, the automatic management device comprises:

at least one sensor configured to measure, in real time, the effective value of a parameter at the output of the actuator for a given control command;

a first computation unit configured to compute, in real time, a theoretical value of said parameter, by applying said control command to a nominal performance model, the nominal performance model modeling the operation of an actuator exhibiting nominal performance;

a second computation unit configured to compute, in real time, the difference between the measured effective value of the parameter and the computed theoretical value of said parameter;

a checking unit configured to compute a so-called adapted gain as a function of this difference, the adapted gain being computed so as to allow the actuator to restore, if necessary, nominal performance when said adapted gain is applied to the servo-valve; and a link configured to apply, in real time, said adapted gain to the servo-valve for it to use it as gain value.

The present invention relates also to an actuator, in particular of an aircraft, which is provided with an automatic management device such as that specified above.

BRIEF DESCRIPTION OF THE FIGURES

The single FIGURE attached will give a good understanding of how the invention can be produced. The FIGURE is the block diagram of a particular embodiment of a device for automatic management of an actuator.

DETAILED DESCRIPTION

The device 1 schematically represented in the FIGURE and used to illustrate an embodiment of the invention, is a device for automatic management of an actuator 2.

As usual, this actuator 2 comprises:
a standard mechanical actuation element 3 ("ACTUATOR"); and
a servo-valve 4 ("SERVO-VALVE") which receives a control command via a link 5 and which controls the actuation element 3 as a function of this control command, as illustrated by a chain-dotted line link 6.

The actuation element 3 of standard type, for example a cylinder, makes it possible to move (or actuate) an associated mechanical part (not represented).

In a preferred embodiment, the actuator 2 is intended to actuate a control surface of an aircraft, such as a flight control surface, a foil flap, an aileron, etc. By way of illustration, it can be an actuator intended to control the rudder from a control command generated by the actuation of a piloting member by a pilot of the aircraft, as specified below.

To control the actuation element 3 in the usual manner, the servo-valve 4 uses a control law using at least one gain.

Such a control law is well known to those skilled in the art and is not described more hereinbelow. It can be any control law using at least one gain.

Moreover, the control command transmitted via the link 5 to the servo-valve 4 of the actuator 3 is generated, in the usual manner, by a control command generation unit (not represented) and is received therefrom. This control command generation unit can be a mechanical element, for example a rudder bar, or an element of another type (knob, touchscreen, etc.) which can be actuated manually by an operator, such as a pilot of an aircraft, to generate a control command. It can also be an automatic unit, for example an automatic pilot system or a flight control computer, which automatically determines a control command.

According to an embodiment of the invention, the automatic management device 1 comprises, as represented in the FIGURE:
a sensor 7 ("SENSOR") which is configured to measure, in real time, the actual value of a parameter at the output of the actuator 2, as illustrated by a chain-dotted line link 8, and do so for a given control command (received via the link 5);
a computation unit 9 which is configured to compute, in real time, a theoretical value of said parameter, by applying said control command (received via the link 5) to a nominal performance model ("MODEL"), the nominal performance model modeling the operation of the actuator 2 when it exhibits nominal performance;
a computation unit 10 ("COMPUTATION") which is configured to compute, in real time, the difference between the measured actual value of the parameter (received via a link 11 from the sensor 7) and the computed theoretical value of said parameter (received via a link 12 from the computation unit 9);
a control unit 14 ("CONTROLLER") which is linked via a link 13 to the computation unit 10 and which is configured to compute a so-called adapted gain, as a function of the difference received from the computation unit 10; and
a link 15 linking the control unit 14 to the servo-valve 4 which is configured to apply, in real time, said adapted gain (computed by the control unit 14) to the servo-valve 4 for it to use it as gain value.

According to an embodiment of the invention, said adapted gain is computed by the control unit 14 so as to allow the actuator 2 to restore, if necessary, nominal performance.

Consequently, the output of the nominal performance model (computation unit 9) is compared to the real output of the actuator 2, and the difference (or error) between the two outputs is used by the control unit 14 to adapt the gain of the servo-valve 4 of the actuator 2.

Thus, when the automatic management device 1 detects that the performance of the actuator 2 is different from a nominal performance (via the computation of the difference between the measured actual value and the corresponding theoretical value), it adapts the gain of the servo-valve 4 in real time (by computing and by applying the adapted gain) to allow the actuator 2 to restore nominal performance.

The automatic management device 1 makes it possible, notably, to compensate for a phase dispersion in the response of the actuator, due to variations of important parameters (pressure, temperature, or manufacturing tolerance of the servo-valve for example).

Said parameter (the values of which are taken into account for the implementation of the invention) can be any parameter, with a value (which varies as a function of the actual performance of the actuator 2) is capable of being measured (or determined) at the output of the actuator 2.

It is therefore a parameter which is critical for the robustness of the control law, for example the phase shift or the gain dispersion of the actuator at the frequencies of the structural modes, for a comfort law (or any law making it possible to control structural modes).

By way of example, said parameter can be one of the following parameters:
a phase shift;
a gain dispersion.

It will be noted that the nominal performance model of the actuator 2 used by the computation unit 9 is known, and is so known as a transfer function between the control command of the control law and the position of the actuator 2.

In a particular embodiment, making it possible to illustrate an implementation of the invention, the automatic management device 1 is intended to adapt the gain of a servo-valve 4 of an aircraft steering actuator, in order at least to reduce the phase-shift between said actuator and the nominal transfer function of the actuator 2.

In this particular embodiment, the control unit 14 computes the adapted gain K using the following expression:

$$K = K_0 * \frac{1}{a * \int (\varphi_0 - \varphi)}$$

in which:
$K_0$ is the initial gain of the servo-valve;
$\varphi_0$ is the phase at the output of the nominal performance model;
$\varphi$ is the phase at the output of the actuator; and a is the adaptation gain setting the speed with which the adapted gain K converges toward the desired value.

In this particular embodiment, the above-mentioned difference corresponds to a phase difference, and this phase difference is computed from the time difference between the zero crossing of the output of the actuator and the closest zero crossing of the output of the nominal performance model, as specified hereinbelow.

In this particular embodiment, the object of the automatic management device 1 is to adapt the gain of the servo-valve of the steering actuator to recover the phase shift of the nominal transfer function of the actuator.

In this particular embodiment, the computation of the phase error (or phase shift) consists in counting the number of sample times between the output of the model crossing zero and the output of the actuator crossing zero (or the other way round, depending on which is the first to cross zero).

The detection of the zero crossing does not always occur for the two signals in sequence. For example, one signal may cross zero, whereas the other signal remains at 0+ε, ε being a very small deviation, and waits for the next control command to cross zero. In this case, the computed phase error is abnormally high. To remedy this drawback, the control unit 14 comprises a monitoring element (not represented) which monitors such situations and validates the phase error signal only if it remains within a predefined maximum time delay.

The control unit 14 also comprises elements (not represented) which detect and memorize the zero crossing of the respective signals.

Furthermore, to eliminate the low and high frequencies which affect the phase error computation, the outputs of the nominal performance model and of the actual actuator are pre-filtered, respectively, by a first order high-pass filter and by a second order low-pass filter. These filters can be incorporated in the control unit 14.

The response of the actuator is not very different from a first order low-pass filter, the time constant τ of which is the inverse of the gain K of the servo-valve. At a given frequency ω (expressed in rad/s), the tangent of the phase, not very different from the phase itself, is ω*τ.

A simple phase controller (control unit 14) which incorporates the phase error responds as a first order filter which ensures the stability of the controller, with:
$\varphi_0$ the phase of the nominal actuator model ($\varphi_0=\omega*\tau_0$);
$\varphi$ the actual phase of the real actuator ($\varphi=\omega*\tau$); and
$K_0$ the initial gain of the servo-valve $$\left(\tau_0 = \frac{1}{K_0}\right).$$

The equation used by the control unit 14 to compute the adapted gain K is as follows (as specified above):

$$K = K_0 * \frac{1}{a * \int (\varphi_0 - \varphi)}$$

Furthermore, $$\tau = \frac{1}{K}.$$

This is equivalent to $\tau=\tau_0*a*\int(\varphi_0-\varphi)$ or to $\tau=\omega*\tau_0*a*\int(\tau_0-\tau)$.

A smoothing element (for example at 5 seconds) can be added to smooth the response of the control unit in case of turbulence and avoid noise on the input of the actuator. This has a negative impact on the stability of the control unit, but makes it possible to avoid reducing the life of the actuator.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatic management of an actuator, said actuator being controlled by a servo-valve using at least one value of a gain and receiving a control command, said method comprising:
   a measurement step including measuring, in real time, the actual value of a parameter at the output of the actuator for a given control command;
   a first computation step including computing, in real time, a theoretical value of said parameter, by applying said control command to a nominal performance model, the nominal performance model modeling the operation of the actuator exhibiting nominal performance;
   a second computation step including computing, in real time, the difference between the measured actual value of the parameter and the computed theoretical value of said parameter;
   a control step including computing an adapted gain of the actuator as a function of the difference, wherein nominal performance is restored using the actuator when said adapted gain is applied to the servo-valve; and
   an application step including applying, in real time, said adapted gain to the servo-valve for the servo-valve to use the adapted gain as gain value,
   wherein, for adapting the gain of a servo-value of an aircraft steering actuator, at least to reduce the phase shift between said actuator and the nominal transfer function of the actuator, the computation step includes computing said adapted gain K using the following expression:

$$K = K_0 * \frac{1}{a * \int (\varphi_0 - \varphi)}$$

in which:
   $K_0$ is an initial gain of the servo-valve (4);
   $\varphi_0$ is a phase at the output of the nominal performance model;
   $\varphi$ is a phase at the output of the actuator; and
   a is an adaptation gain setting the speed with which the adapted gain K converges toward a desired value.

2. The method as claimed in claim 1, wherein said performance model comprises a transfer function between a control command of a control law and the position of the actuator.

3. The method as claimed in claim 1, wherein said parameter is one of the following parameters:
  a phase shift; and
  a gain dispersion.

4. The method as claimed in claim 1, wherein said difference corresponds to a phase difference, said phase difference being computed from the time difference between the zero crossing of the output of the actuator and the closest zero crossing of the output of the nominal performance model.

5. A device for automatic management of an actuator, said actuator being controlled by a servo-valve using at least one value of a gain and receiving a control command, said device comprising:
  at least one sensor configured to measure, in real time, the actual value of a parameter at the output of the actuator for a given control command;
  a first computation unit configured to compute, in real time, a theoretical value of said parameter, by applying said control command to a nominal performance model, the nominal performance model modeling the operation of the actuator exhibiting nominal performance;
  a second computation unit configured to compute, in real time, the difference between the measured actual value of the parameter and the computed theoretical value of said parameter;
  a control unit configured to compute an adapted gain as a function of the difference, wherein nominal performance is restored using the actuator when said adapted gain is applied to the servo-valve; and
  a link configured to apply, in real time, said adapted gain to the servo-valve for it to use it as gain value,
    wherein, for adapting the gain of a servo-valve of an aircraft steering actuator, at least to reduce the phase shift between said actuator and the nominal transfer function of the actuator, the computation step includes computing said adapted gain K using the following expression:

$$K = K_0 * \frac{1}{a * \int (\varphi_0 - \varphi)}$$

in which:
  $K_0$ is an initial gain of the servo-value (4);
  $\varphi_0$ is a phase at the output of the nominal performance model;
  $\varphi$ is a phase at the output of the actuator; and
  a is an adaptation gain setting the speed with which the adapted gain K converges toward a desired value.

6. The device according to claim 5, wherein said performance model comprises a transfer function between a control command of a control law and the position of the actuator.

7. The device according to claim 5, wherein said parameter is one of the following parameters:
  a phase shift; and
  a gain dispersion.

8. The device according to claim 5, wherein said difference corresponds to a phase difference, said phase difference being computed from the time difference between the zero crossing of the output of the actuator and the closest zero crossing of the output of the nominal performance model.

9. An actuator for an aircraft, said actuator being controlled by a servovalve using at least one value of a gain and receiving a control command,
  wherein the actuator comprises an automatic management device comprising: at least one sensor configured to measure, in real time, the actual value of a parameter at the output of the actuator for a given control command;
  a first computation unit configured to compute, in real time, a theoretical value of said parameter, by applying said control command to a nominal performance model, the nominal performance model modeling the operation of the actuator exhibiting nominal performance;
  a second computation unit configured to compute, in real time, the difference between the measured actual value of the parameter and the computed theoretical value of said parameter;
  a control unit configured to compute an adapted gain as a function of the difference, wherein nominal performance is restored using the actuator when said adapted gain is applied to the servo-valve; and
  a link configured to apply, in real time, said adapted gain to the servo-valve for it to use it as gain value;
    wherein, for adapting the gain of a servo-valve of an aircraft steering actuator, at least to reduce the phase shift between said actuator and the nominal transfer function of the actuator, the computation step includes computing said adapted gain K using the following expression:

$$K = K_0 * \frac{1}{a * \int (\varphi_0 - \varphi)}$$

in which:
  $K_0$ is an initial gain of the servo-value (4);
  $\varphi_0$ is a phase at the output of the nominal performance model;
  $\varphi$ is a phase at the output of the actuator; and
  a is an adaptation gain setting the speed with which the adapted gain K converges toward a desired value.

10. The actuator according to claim 9, wherein said performance model comprises a transfer function between a control command of a control law and the position of the actuator.

11. The actuator according to claim 9, wherein said parameter is one of the following parameters:
  a phase shift; and
  a gain dispersion.

12. The actuator according to claim 9, wherein said difference corresponds to a phase difference, said phase difference being computed from the time difference between the zero crossing of the output of the actuator and the closest zero crossing of the output of the nominal performance model.

* * * * *